(12) United States Patent
Andrews

(10) Patent No.: US 11,116,266 B2
(45) Date of Patent: Sep. 14, 2021

(54) MAGNETIC CLIP, SYSTEM AND METHOD FOR USING ONE OR MORE MAGNETIC CLIPS

(71) Applicant: Traci Andrews, Fort Lauderdale, FL (US)

(72) Inventor: Traci Andrews, Fort Lauderdale, FL (US)

( * ) Notice: Subject to any disclaimer, the term of this patent is extended or adjusted under 35 U.S.C. 154(b) by 0 days.

(21) Appl. No.: 16/889,338

(22) Filed: Jun. 1, 2020

(65) Prior Publication Data

US 2020/0288799 A1 Sep. 17, 2020

Related U.S. Application Data

(63) Continuation-in-part of application No. 15/883,309, filed on Jan. 30, 2018, now Pat. No. 10,716,345.

(60) Provisional application No. 62/453,627, filed on Feb. 2, 2017, provisional application No. 62/875,220, filed on Jul. 17, 2019.

(51) Int. Cl.
*A41F 1/00* (2006.01)
*F16M 13/02* (2006.01)
*A43C 9/00* (2006.01)
*A41D 27/08* (2006.01)

(52) U.S. Cl.
CPC .............. *A41F 1/002* (2013.01); *A41D 27/08* (2013.01); *A43C 9/00* (2013.01); *F16M 13/022* (2013.01)

(58) Field of Classification Search
CPC ........... A41D 27/08; A41F 1/002; A43C 9/00; A44D 2203/00; F16M 13/022; G09F 2007/1852
See application file for complete search history.

(56) References Cited

U.S. PATENT DOCUMENTS

| | | | | |
|---|---|---|---|---|
| 4,261,121 | A * | 4/1981 | Coon | A47G 25/485 223/96 |
| 5,347,671 | A * | 9/1994 | Hunts | B65D 33/1675 24/30.5 R |
| 5,960,520 | A * | 10/1999 | Conway | A47C 21/022 24/306 |
| 7,793,518 | B1 | 9/2010 | Holleman | |
| 8,443,494 | B2 | 5/2013 | Sharp | |
| 8,769,780 | B1 | 7/2014 | Segel | |
| 9,500,209 | B2 | 11/2016 | Bonno et al. | |
| 2002/0034992 | A1* | 3/2002 | Tate | A63B 57/207 473/406 |
| 2006/0282993 | A1* | 12/2006 | Dietz | B43K 23/001 24/303 |
| 2011/0252609 | A1* | 10/2011 | Rothbaum | H04R 1/1033 24/306 |

(Continued)

*Primary Examiner* — David M Upchurch
(74) *Attorney, Agent, or Firm* — Laurence A. Greenberg; Werner H. Stemer; Ralph E. Locher

(57) ABSTRACT

A magnetic clip, a system including one or more such magnetic clips, and a method for their use are provided. The two-part magnetic clip includes a clip body and a post that is separate from, and completely detachable from, the clip body, the post not being integrally formed with the clip body. The clip body and post are configured to magnetically mate with one another with a portion of an attaching material captured between them. Each clip body is formed to include at least one loop for attaching a connector, decorative element or tying material to the clip body.

20 Claims, 12 Drawing Sheets

(56) References Cited

U.S. PATENT DOCUMENTS

2013/0219667 A1* 8/2013 Walczak ................ A44B 99/00
  24/3.1
2014/0250640 A1 9/2014 Crooks
2015/0305432 A1 10/2015 Wiens
2016/0309852 A1* 10/2016 Krasney .................. A44B 6/00

* cited by examiner

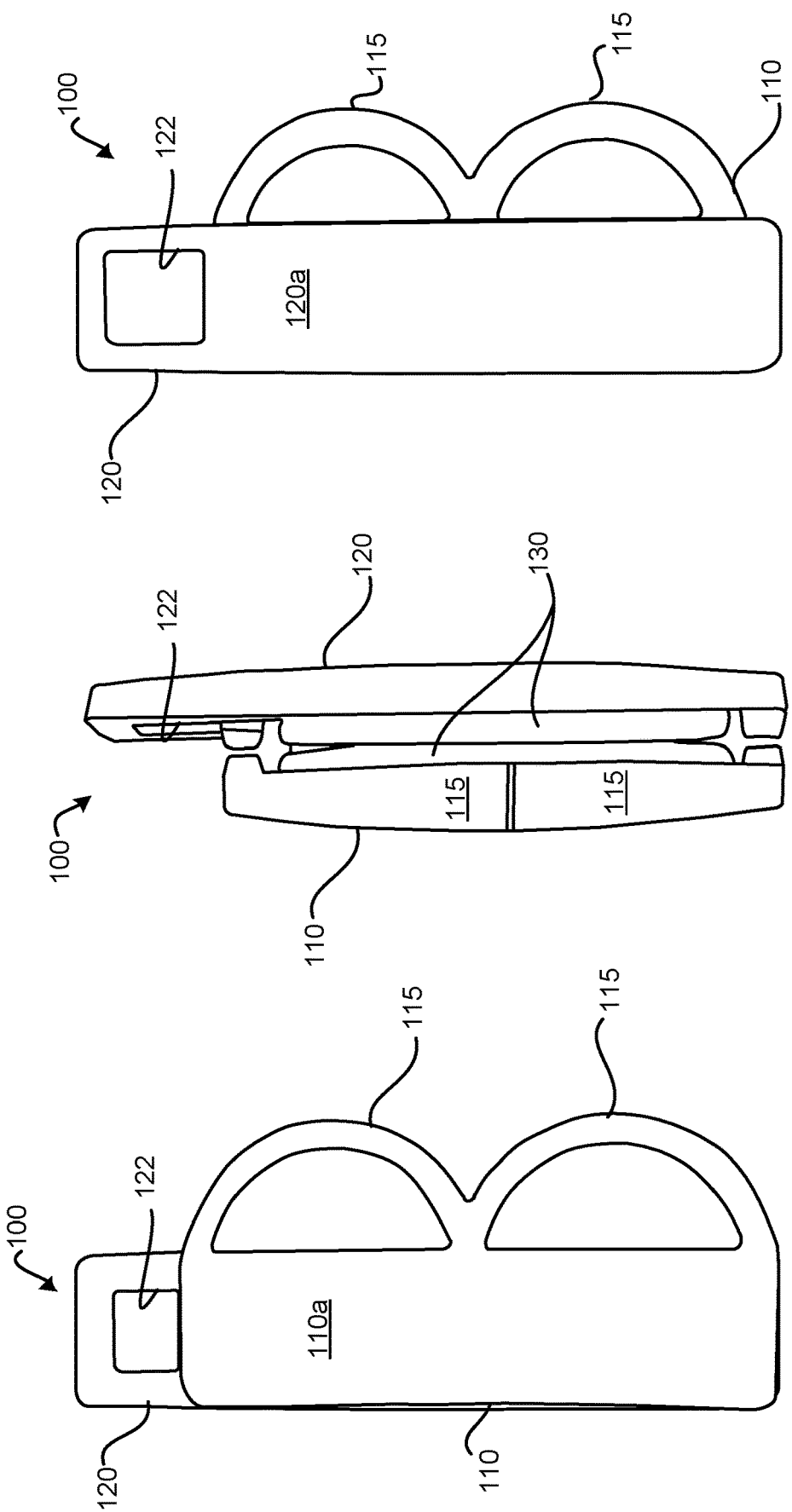

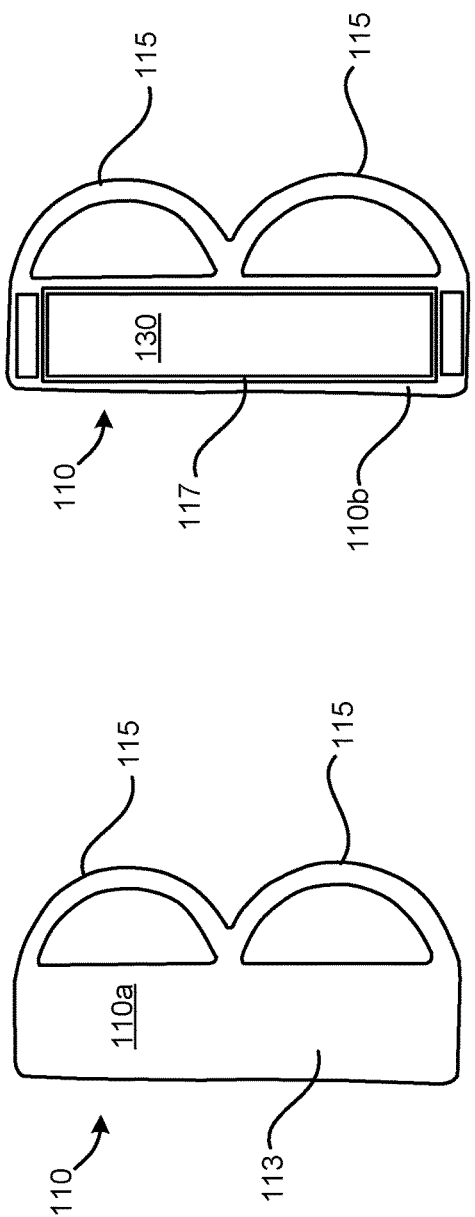
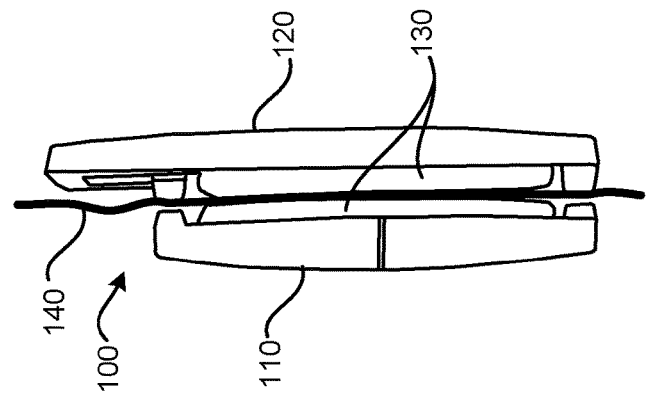
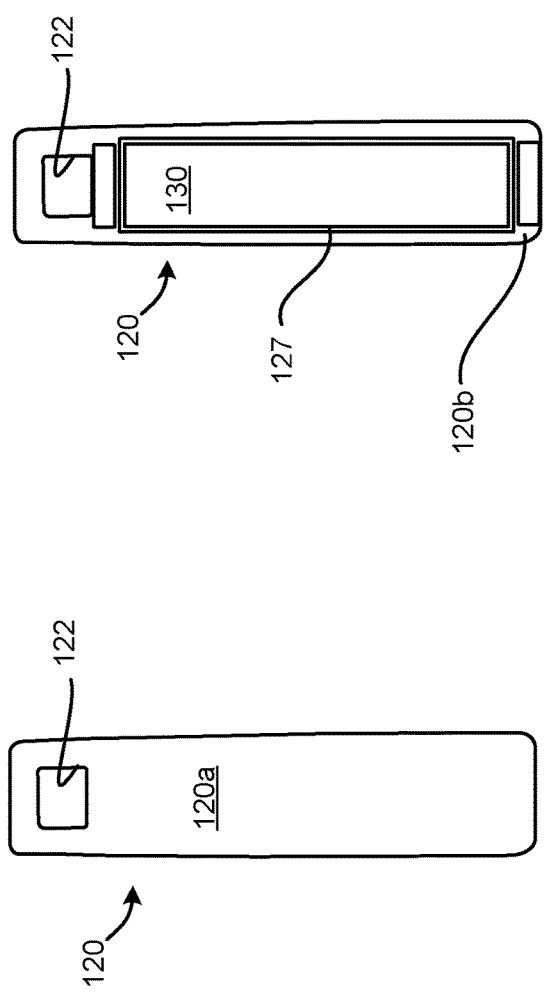

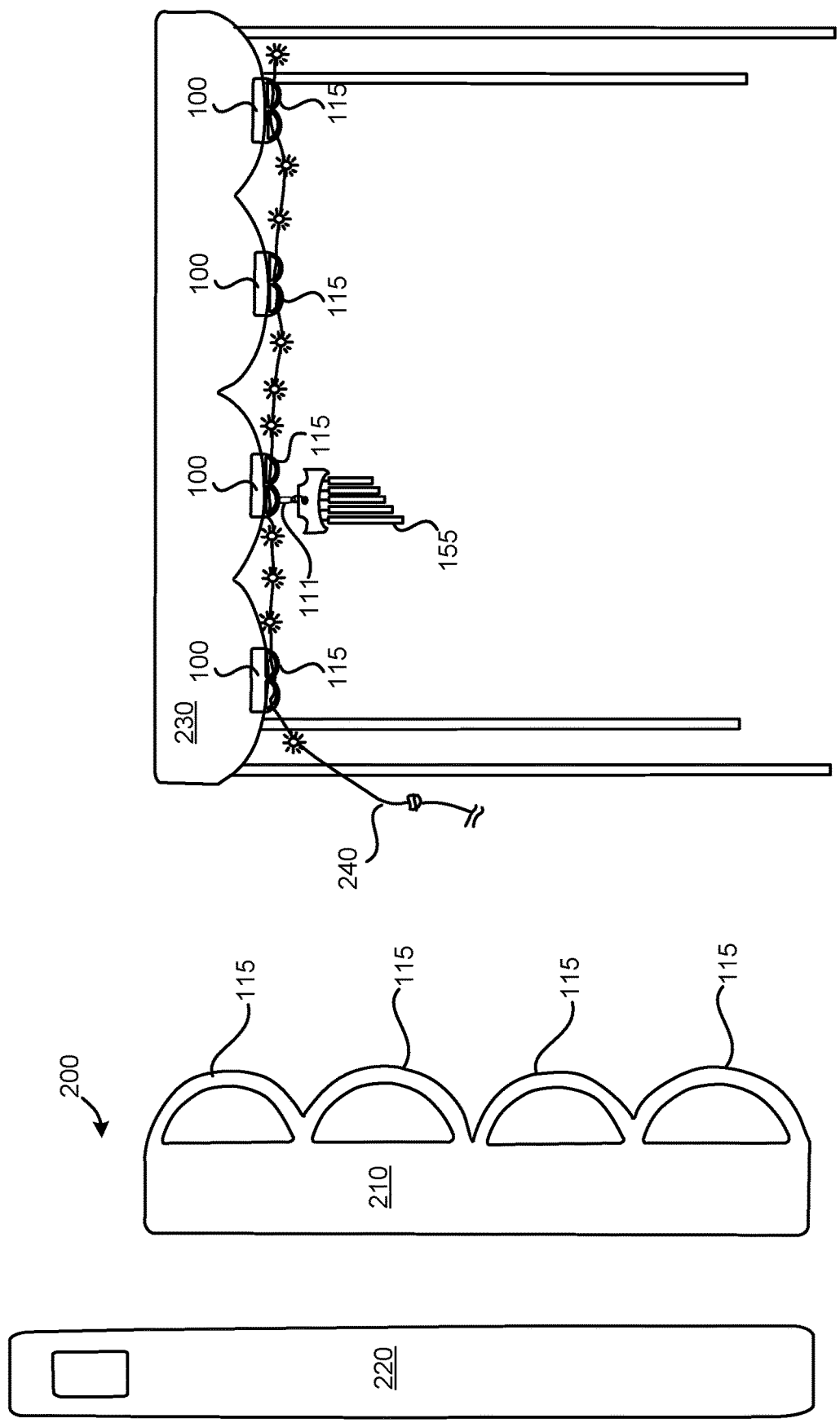

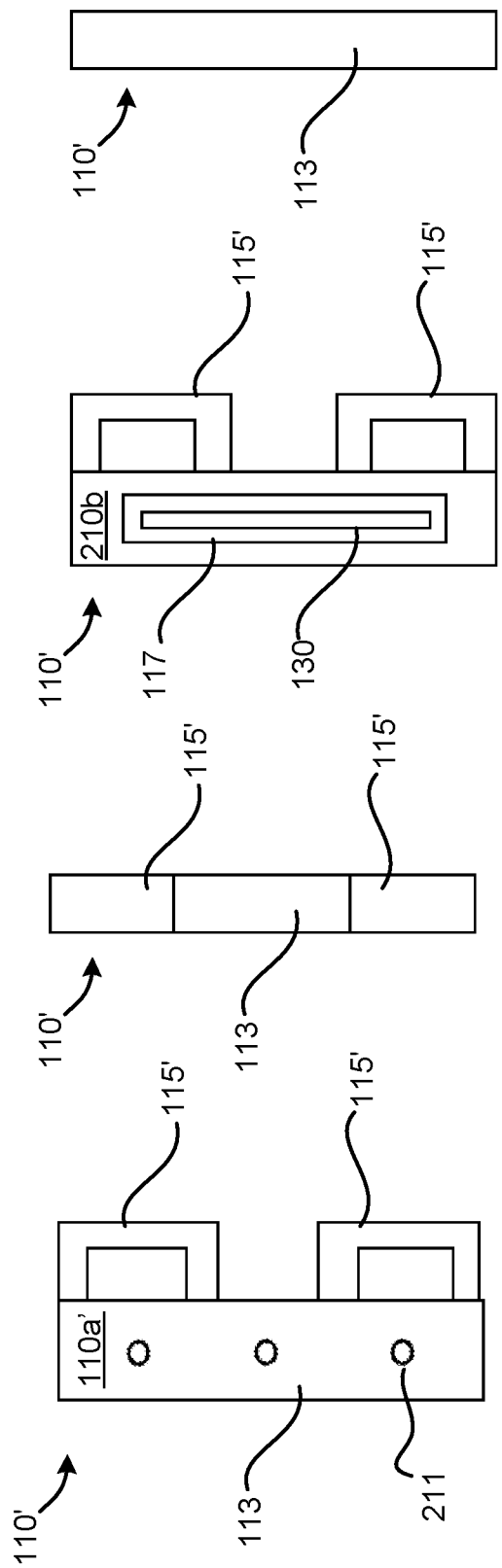

MAGNETIC CLIP, SYSTEM AND METHOD FOR USING ONE OR MORE MAGNETIC CLIPS

CROSS-REFERENCE TO RELATED APPLICATIONS

The present application claims benefit of Provisional Patent Application No. 62/875,220, filed on Jul. 17, 2019, entitled Accessory Including a Magnetic Clip and Method for Using the Accessory, and is a continuation-in-part of co-pending Non-Provisional patent application Ser. No. 15/883,309, filed on Jan. 30, 2018, and entitled Fashion Accessory Including a Cinch Clip, which claims priority to Provisional Patent Application No. 62/453,627 filed on Feb. 2, 2017; all of those applications being incorporated herein, by reference, in their entireties.

BACKGROUND OF THE INVENTION

Field of the Invention

The invention relates generally to a magnetic clip, a system including one or more such magnetic clips, and a method for their use. More particularly, in accordance with an embodiment of the invention, a two-part magnetic clip is provided for attaching to an article and/or supporting an article or decorative element. The two-part magnetic clip includes a clip body and a post that is separate from, and completely detachable from, the clip body, the post not being integrally formed with the clip body. The clip body and post are configured to magnetically mate with one another with a portion of an attaching material captured between them. Each clip body is formed to include at least one loop for attaching a connector, decorative element or tying material to the clip body.

Description of the Related Art

Magnetic accessories are known. For example, U.S. Pat. No. 7,793,518 to Holleman discloses a magnetic clothes gathering clasp having an outside member that is connected to an inside member by a chain or other flexible retainer. A portion of a garment gathered with the chain is then retained by the chain in conjunction with opposed magnets on the inside and outside members. See, for example, the Abstract of Holleman. Similarly, U.S. Pat. No. 9,500,209 to Bonno et al discloses a clip for object grouping and organized storage. Because of the principle of operation and structure of Holleman and Bonno, the retaining members cannot be completely detached from one another. As such, the use of the device is limited by the location of an edge of the attaching material and the length of the retaining member (i.e., the hinge in Bonno or chain of Holleman). For example, the body 12 of Bonno cannot be used to clip anything to the middle of an article or garment with the clip body on one of the inside or outside and the post on the other of the inside or the outside of the article or garment. Rather, because the upper part of the body 12 and lower part of the body 12 are integrally formed together, in order to have one part on the outside of the fabric and the other on the inside of the fabric, the body 12 must be located at an edge of the garment, as disclosed in col. 3 of Bonno, line 12.

What is needed is a two-part magnetic clip wherein the parts are completely detachable from one another, so that they can be placed on an attaching material at any position on the attaching material. What is further needed is a magnetic clip that can adhere to an attaching material and support a decorative article and/or modify the tautness or appearance of the attaching material, without damaging the material to which it is attached.

SUMMARY OF THE INVENTION

It is accordingly an object of the invention to provide an magnetic clip, a system including a magnetic clip, and a corresponding method of use that addresses the needs set forth above. For example, one or more magnetic clips according to the present invention can be placed at any location on an article without permanently altering or damaging it.

With the foregoing and other objects in view there is provided, in accordance with one particular embodiment of the invention, an inventive two-part magnetic clip, a system including such clip and a method for using it. In one particular embodiment, the accessory includes at least one magnetic clip including a clip body having at least one loop extending from it, and a completely detachable post configured to magnetically attach to the clip body. In a more preferred embodiment of the invention, two or more loops extend from the clip body of the magnetic clip. In a more preferred embodiment, the two or more loops extend from the same elongate side of a base of the magnetic clip body. In a further preferred embodiment, the magnetic clip includes at least two magnetic clips connected to one another by magnetic attraction, one on each of the clip body and the post.

In a further embodiment of the invention, a system is provided including at least one two-part magnetic clip and a connector or an elongated tying material. In another embodiment of the invention, two or more magnetic clips are used to temporarily modify and/or decorate an article. For example, in one particular embodiment of the invention, the a system of magnetic clips is used to mount decorative items, lighting and/or signs to an attaching material, such as, but not limited to, an attaching material, such as a fabric, window or porch screening, PVC, curtains, metal or glass.

In accordance with another embodiment of the invention, one or more magnetic clips can be used to create a decorative pleat or pleats in attaching an material, or a decorative rolled edge pleat, as will be described more particularly below. In accordance with a further embodiment of the invention, one or more magnetic clips and an elongate tying material may be used for cinching an attaching material and/or providing support for the attaching material. It should be understood that the term "attaching material", used herein, can include, but not be limited only to, any of the foregoing materials to which an accessory or accessories in accordance with the present invention can be attached.

Other features which are considered as characteristic for the invention are set forth in the drawings, description and appended claims.

Although the invention is illustrated and described herein as embodied in a magnetic clip, system and method for using one or more magnetic clips, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which like reference numerals represent like items.

BRIEF DESCRIPTION OF THE DRAWING

FIG. 1A is a front plan view of a of a magnetic clip according to one particular embodiment of the invention;

FIG. 1B is a side, perspective view of the magnetic clip of FIG. 1A, viewed from the right side;

FIG. 1C is a rear plan view of the magnetic clip of FIG. 1A;

FIG. 2A is a front plan view of the main body of a magnetic clip, according to one particular embodiment of the invention;

FIG. 2B is a rear plan view of the main body of FIG. 2A;

FIG. 3A is a front plan view of a post of a magnetic clip, according to one particular embodiment of the invention;

FIG. 3B is a rear plan view of the post of FIG. 3A;

FIG. 4 is a is a side, perspective view of the magnetic clip according to one particular embodiment of the invention, having an article captured between the main body and the post;

FIG. 5 is a front plan view of a two-part magnetic clip according to another embodiment of the present invention;

FIG. 5A is a front plan view of a clip body in accordance with a further embodiment of the present invention;

FIG. 5B is a right side plan view of the clip body of FIG. 5A;

FIG. 5C is a rear plan view of the clip body of FIG. 5A;

FIG. 5D is a right side plan view of the clip body of FIG. 5A;

FIG. 6 is a perspective view of a tent having a plurality of clips according to the present invention being used to support a decorative strand of lights;

DETAILED DESCRIPTION OF THE INVENTION

Figure 8A:
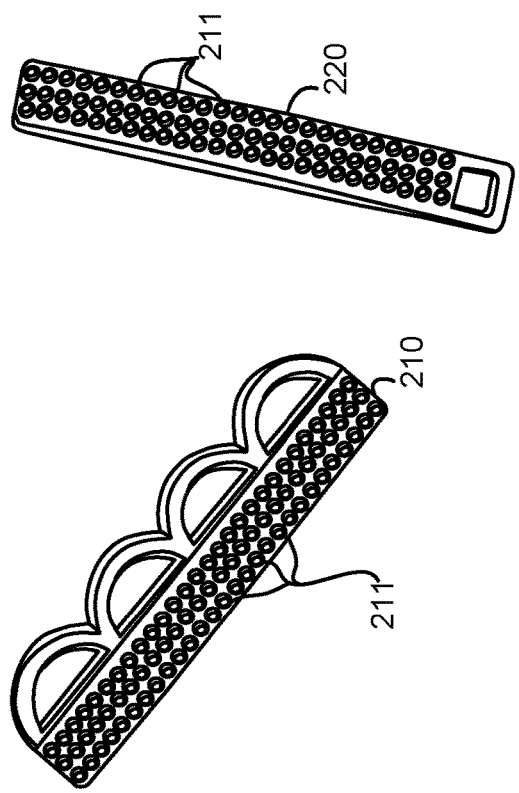
FIGS. 8A and 8B are a decorated clip having 2 loops and a decorated clip having 4 loops, respectively, in accordance with particular embodiments of the invention.

Referring now to FIGS. 1A-1C, a magnetic clip 100, in accordance with one particular embodiment of the invention, is provided. Magnetic clip 100 can be used, by itself, or in combination with other magnetic clips 100, to decorate an article to which it is attached, and/or to support an article and/or a decorative element. For example, in one particular embodiment of the invention, a magnetic clip 100, or a system including a plurality of magnetic clips 100, is used to mount decorative items, lighting and/or signs to an article or attaching material, such as, but not limited to, fabric, leather, vinyl, plastic, window or porch screening, PVC, curtains, metal and/or glass. In another embodiment, one or more magnetic clips 100 are used to create a decorative pleat or pleats in an article or attaching material, or a decorative rolled edge pleat, as will be described more particularly below. Further, as will be described in connection with another embodiment, one or more magnetic clip accessories can be used in combination with a tying material to tighten or cinch an article or attaching material. It should be understood that the terms "article" or "attaching material", used herein, can include, but not be limited only to, any of the foregoing materials to which an accessory or accessories in accordance with the present invention can be attached. Additionally, for purposes of explanation the terms "article" and "attaching material" will be used interchangeably, herein.

Referring more particularly to FIGS. 1A-4, there is shown a magnetic clip 100 in accordance with one particular embodiment of the present invention. Each magnetic clip 100 is configured as two main, separable parts: a clip body 110; and an elongated post 120 that is a separate piece from, and completely detachable from, the clip body 110, i.e., the elongated post 120 is not integrally formed with the clip body 110 and attaches to the clip body 110 by magnetic forces only. In one embodiment of the invention, the magnetic clip 100 is configured to be reversible, and as such, each of the clip body 110 and post 120 have a finished face 110a, 120a, that faces out from the magnetic clip 100 when the two parts 110, 120 are mated together. Opposite each finished face 110a, 120a, is a back side 110b, 120b, which back sides are configured to face one another, when the two parts 110, 120 are mated together.

In one embodiment of the invention, a magnet 130 is attached to the back side of at least one of the clip body 110 and the post 120. If the other of the clip body 110 and post 120 is made of metal, it is possible to use only the one magnet 130, if desired. In one particularly preferred embodiment of the invention, an elongated magnet 130 is provided on the back side of each of the clip body 110 and post 120, as illustrated in FIGS. 1B, 2B and 3B, in complementary fashion (i.e., having opposite poles), so that the unfinished surfaces 110b, 120b of the clip body 110 and post 120, respectively, are strongly attracted to one another and held together when mated, as illustrated in FIGS. 1A-1C, even when an attaching material 140 separates the clip body 110 from the post 120.

The post 120 of the present embodiment additionally includes a loop formed by an aperture 122 through the post 120, which, when the post 120 is positioned facing out from the attaching material, can be used to hang a charm or decorative article from the post 120. However, it should be understood that the aperture 122 can be omitted, if desired. Additionally, although illustrated as being square, apertures of other shapes can be provided in the post 120. The post 120 includes first and second elongated, lengthwise edges defined between shorter second and third end faces, the first and second elongated, lengthwise edges of which do not have loops extending therefrom.

In the present embodiment, each clip body 110 of a magnetic clip 100 is illustrated as having a rectangular base 113, which may be made of any material, as desired (e.g. metal, plastic, composite bar, wood, etc.). In the preferred embodiment, one or more loops 115 extend from the base 113 perpendicular to a longitudinal axis through the rectangular base 113, and are not formed in the base 113, or collinear with the longitudinal axis extending through the base 113. The illustration of a rectangular base 113 is not meant to limit the invention only thereto, as any functional arbitrary shape is possible for the base 113 in keeping with the scope and spirit of the present invention. In the present preferred embodiment of the invention, one or more loops 115 are formed with, or otherwise attached to, the base 113.

The loop 115 is provided for securing a material to the clip body 110. In a preferred embodiment, two or more loops 115 are provided. In one particular embodiment, the clip body 110 includes a first lengthwise edge defined between shorter second and third end faces, and the two or more closed loops both extend off from, and are formed integral with, the first lengthwise edge of the base 113 of the clip body 110. The loops 115 are used, in one embodiment, for passing an elongate strand material or tying material (160 of FIGS. 12 and 13), such as yarn, string, thread, leather thong, wire—including electrical wire, etc., therethrough, from which a decorative article can be hung, or which can be used to connect the magnetic clip 100 to one or more other magnetic clips 100. For example, as will be discussed more particularly below, one or more magnetic clips 100 can be used to mount decorative lighting, signs and more to attaching materials, such as a tent, awning, porch screen.

In the preferred embodiment illustrated in FIGS. 1A-4, the loops 115 are illustrated as being semi-circular, however it is not meant to limit the loops 115 to only a semi-circular shape. Rather, the loops 115 can have other shapes, such as square, triangular, rectangular or other geometric shapes, as desired. See, for example, the square loops 115' of clip body 110' illustrated in FIGS. 5A-5D. Additionally, it should be understood that a magnetic clip can be designed with 1, 2, 3, 4, 5 or even more loops, without departing from the scope or spirit of the present invention. For example, referring now to FIG. 5, an exemplary clip 200 is provided having an elongated clip body 210 including four loops 115. The body 210 is paired with a post 220, as described in connection with the embodiment of FIGS. 1A-4, to form a magnetic clip 200, in accordance with one particular embodiment of the invention. The clip 200 is, otherwise, as described in connection with the clip 100 of FIGS. 1A-4, including magnets, not shown.

Further, in one particular embodiment of the clip 100 of FIGS. 1-3B, the body 110 is about 1⅛ inches in length and about ⅝ inches in width, at its widest point, while the post 120 is about 1½ inches in length and about 5/16 of an inch in width. Additionally, in one particular embodiment of the clip 200 of FIGS. 1-3B, the body 210 is about 2¼ inches in length and about ⅝ inches in width, at its widest point, while the post 220 is about 2⅜ inches in length and 5/16 of an inch in width. However, it is not intended that the invention be limited only to a clip having the foregoing dimensions, as other clip sizes can be used without departing from the scope and spirit of the present invention.

Referring now to FIGS. 1A-5, It should be recognized that many different geometric loop designs are possible, as the loops 115 merely have to be shaped for receiving a strand material or other connector (such as a carabiner or "D" ring) there through. Additionally, it is preferable that the loop 115 be closed, so that the strand material or connector does not slip out from the loop 115 when passed therethrough. However, the loops 115 can be open along their perimeter, so that a strand or connector can be slid into the loop 115, if desired. It should be understood that, as described above, different connectors or strand materials can be connected to and/or woven through the loops 115 to carry different decorative items. For example, in one embodiment illustrated in FIG. 6, a plurality of clips 110 (and/or clips 210, if desired) are clipped along the periphery of a tent, awning or canopy 230, by magnetically clipping the post 120 to the body 110, in order to support a strand of decorative lights 240 woven through the loops 115 of a plurality of clips 100. It should be noted that other things can be supported by the attaching material, if desired. For example, a connector 111, such as a ring, carabiner, zip tie, etc., is used to secure a wind chime 155 or mobile from a loop 115 of a clip 100. Additionally, referring now to FIG. 7, in one embodiment of the invention, a sign 250 is supported from an attaching material using two clips 100 and a decorative strand material, such as a decorative string, ribbon, cord or wire.

Referring now to FIGS. 1-7, a method for mounting decorative lights, signs or another article, will be described. In one particular embodiment of the invention, a system of two or more clips 100 or 200 will be used and some decorative strand material or connectors. A user will slide apart the clip body 110, 210 from its post 120, 220, to separate them and disengage the magnets 130. The user than places the looped (i.e., arched) body side 110 of the clip 100 on top of the attaching material 230 (i.e., fabric, vinyl, plastic sheeting, aluminum gutters, PVC, porch screen, curtains, metal, plastic, glass, etc.). The user then takes the flat post 120, 220 of the clip 100, 200 and places it underneath the attaching material 230, capturing the selected attaching material 230 in the middle between the two magnets 130 of the clips 100, 200.

The looped body 110, 210 can be used to tie or anchor lights 240, decorations, bows, signs 250, garland, ornaments, or light-weight home decor. It can be seen from the foregoing that the looped body 110, 210 can also be used to mount a decorative or congratulatory sign to PVC, curtains, lampshades, metal, or cloth verticals, aluminum gutters, window panes, etc. Other uses include, but are not limited to: creating gazebo lighting by attaching to tulle or fabric for weddings; using in children's rooms to attach a swag curtain to an existing curtain (by attaching swag end to end, no extra rod is needed); attaching twinkle lights or a decorative piece of fabric to a lampshade or curtain; and mounting a clip to the bottom section of a table cloth to mount a garland and/or decorations and/or bows.

Figure 8B:
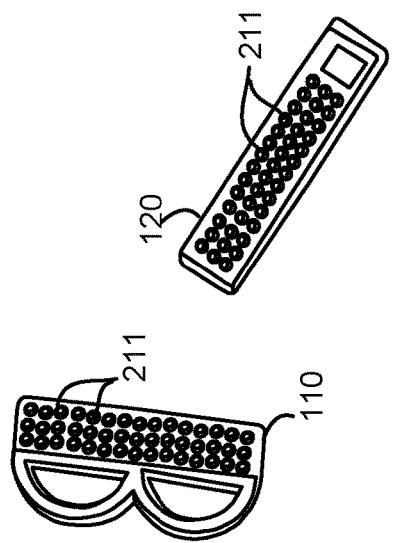

Referring now to FIGS. 5A, 8A and 8B, for aesthetic or decorative purposes, one or more decorations 211, which may be one or more of a design, emblem, gemstone or charm, may be provided on, or embedded into, one or both of the front face of the clip body and/or the front face of the post. The decoration 211 may be of any shape, decorative piece or design, such as, for example, a gem stone. See, for example, FIG. 8A, wherein the outer faces (opposite from the magnet faces) are covered in jewels and/or rhinestones. Additionally, one or more of the loops 115 and/or the loop formed by the aperture 122 can be used to hang a charm or other hanging decoration there from, if desired.

Referring back to FIGS. 1A-5, in the present preferred embodiment, in order to ensure that the clip body 110 strongly mates with the post 120, a recess 117 is provided in the back face 110b of the clip body 110, 210 and configured to receive a magnet 130. Similarly, in the present preferred embodiment, the back face 120b of the post 120 includes a recess 127 that receives a magnet 130. Note that, if desired, the recess 117 and/or recess 127 may be omitted, and the magnet(s) secured directly to the rear face 110*b*, 210*b*, 120*b* of the respective part using a cement or adhesive. In a preferred embodiment, the magnets 130 are permanently affixed to the body 110 and/or post 120.

Figure 7:
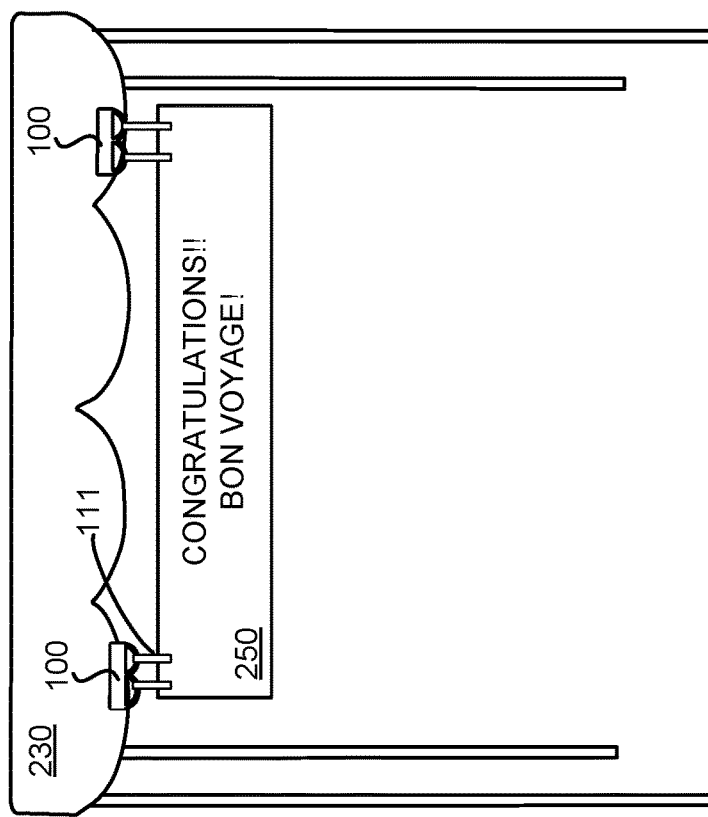
FIG. 7 is a perspective view of a tent having a plurality of clips according to the present invention being used to support a decorative sign.

The magnets are mounted in the clip body 110/210 and post 120/220 in a complementary fashion, so that the body 110 or 210 and post 120 or 220 attract one another, rather than repelling one another. In one particular embodiment of the invention, rare earth magnets are used as the magnets 130, to provide a strong attraction and holding force between the clip body 110 or 210 and the post 120, even with a piece of attaching material 140 in-between, as illustrated in FIG. 4. In this manner the piece of attaching material 140 is gripped by the magnetic clip 100 without being damaged. Thus, as illustrated in FIGS. 4, 6 and 7, the magnetic clip 100 includes a clip body 110 (or 210, as desired) and a post 120, wherein the clip body 110 is provided on one of the inside or outside of the side of the attaching material 140, 230 and the post 120 is provided on the other one of the inside or outside of the attaching material 140, 230, to secure the magnetic clip 100 to the attaching material 140, 230. Alternately, if that material 140, 230 is flexible, both parts 110, 120 may be on the same face of the attaching material 140, 230, on either side of a folded over piece of the attaching material 140, 230. See, for example, FIG. 12 including a post 120 on one side (i.e., inside or outside) of the fold 144 and the clip body 110 on the other side of the fold 144.

As discussed above, each part 110/210 and 120 may include a magnet 130, as illustrated. Alternately, if desired, one of the clip body 110/210 or the post 120 can include a magnet, while the other is made of a magnetically attractive material, such as iron. In this alternate embodiment, the body 110/210 and post 120 would be held to each other due to the magnetic attraction between the magnet 130 on the one part 110/210 or 120/220 and the magnetically attractive material of the other part 110/210 or 120/220.

Figure 9B:
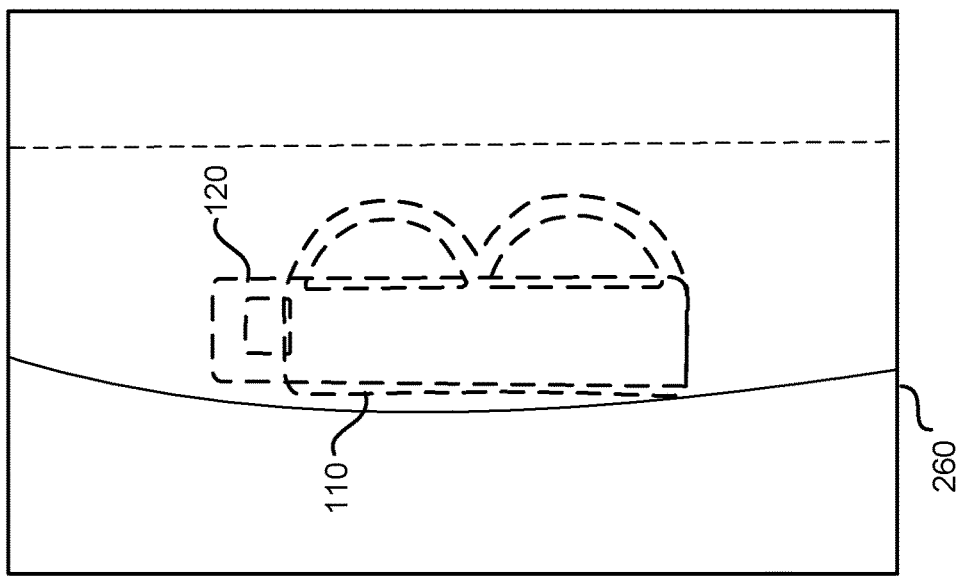
FIGS. 9A and 9B illustrates the use of a clip, in accordance with one particular embodiment of the invention.
Figure 9A:
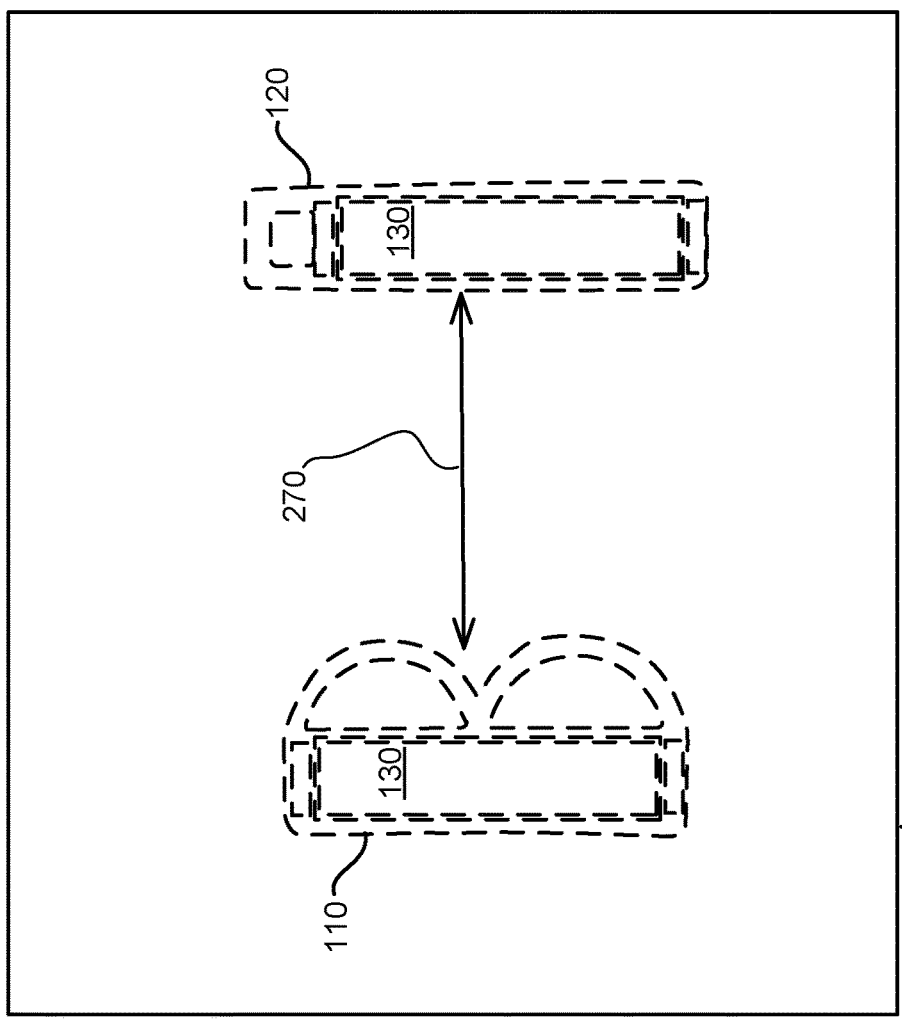

Referring back to FIGS. 1A-5, a single magnetic clip 100 can be used, alone, if desired, to gather a scarf or belt or to affix a charm or decoration to a garment or other attaching material 140. Additionally, referring now to FIGS. 9A-9B, a single magnetic clip 100 (or 200) can be used to create a single hidden pleat in a garment 260 or other attaching material. More particularly, a clip 100 (or 200, if desired) having two magnets 130, one on each of the body 110 and the post 120, can be used to create a single hidden pleat by, first, separating the magnets 130 from one another. This can be done by sliding the body 110 and post 210 apart from one another to separate them. Then, both the body 110 and the post 120 are placed under the attaching material (in this case, garment 260) with both magnets 130 touching the inside surface of the garment 260, as illustrated in FIG. 9A. Then, the fabric 260 is folded in the middle, to mate the clip 100, as illustrated in FIG. 9B. The distance 270 between the magnets 230 will determine how much garment 260 will be taken in by the pleat. In this embodiment, both the body 110 and post 120 will be hidden by the fabric. Note that this can method can additionally be used to take the slack out of other material, such as a tent, bed sheet, duffle bag, etc.

Figure 15:
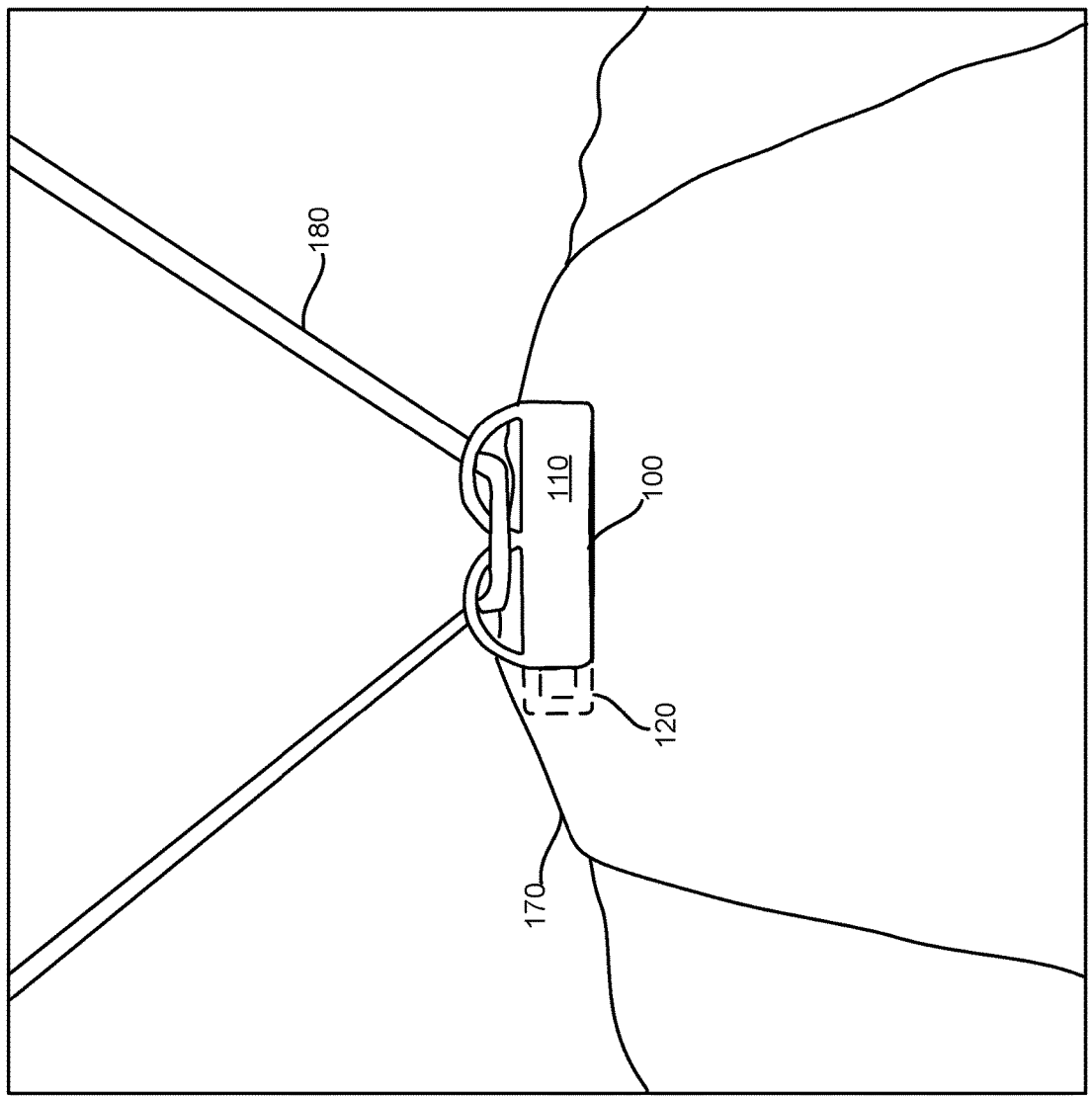
FIG. 15 illustrates a magnetic clip accessory including a single, two-part magnetic clip, positioned sideways, to hold up a scarf or a strapless garment, via a neck strap laced through loops of the clip body, in accordance with another particular embodiment of the invention.

Other uses can be made for a magnetic clip system including an elongated tying material and only one cinch clip 100, 100', 200, in accordance with one embodiment of the invention. For example, referring now to FIG. 15, a single cinch clip 100 can be used sideways to create shoulder straps or a connection point for a neck strap180 (laced through the loops 115) for holding up a scarf 170 fashioned as a top or dress worn by a user. A magnetic clip 100, 100', 200, can be further used on the center of a bra to create a unique neckline, or to create belts, tops, and dresses or make anything form fitting, and/or decorative (i.e., including by affixing a charm or decoration to the attaching material).

Figure 10B:
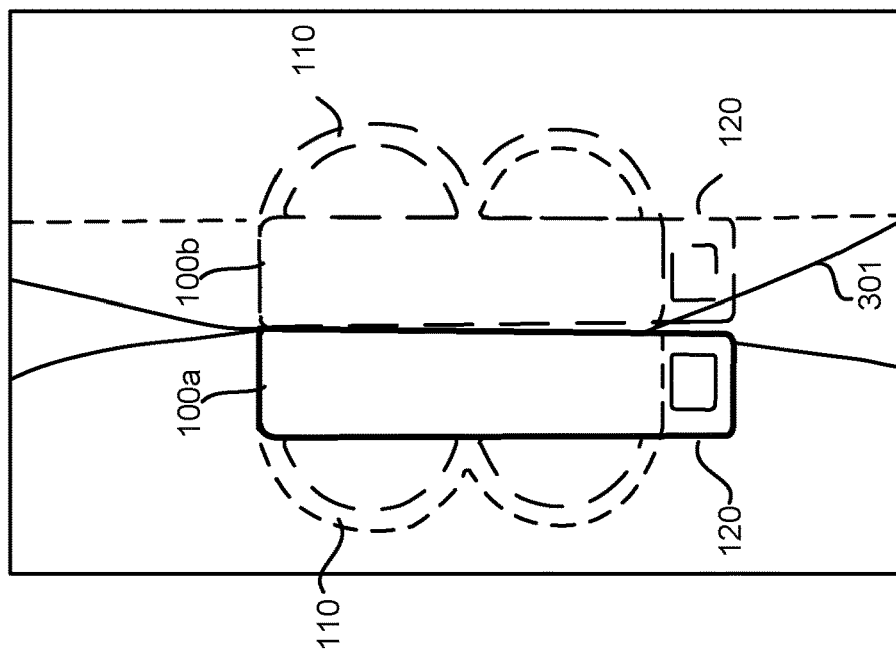
FIGS. 10A and 10B illustrates the use of a pair of clips, in accordance with one particular embodiment of the invention.
Figure 10A:
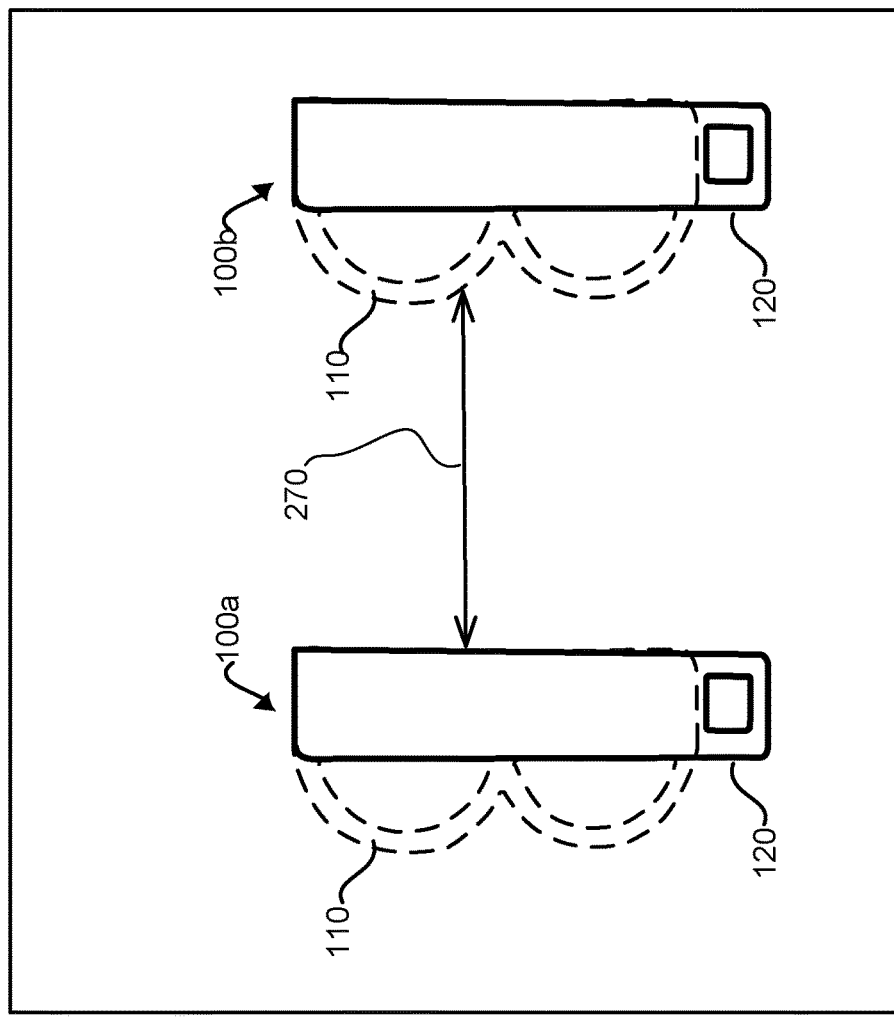

In accordance with another particular embodiment of the invention, a system is provided that uses two or more magnetic clips 100 or 200, in combination. Referring now to FIGS. 10A-10B of the instant application, an exemplary pair of magnetic clips 100*a*, 100*b* are used to create a rolled edge. In particular, two clips 100*a*, 100*b*, each containing a body 110 and post 120 are used. It should be understood that, for purposes of explanation, the two described embodiments of magnetic clips 100, 200, and/or magnetic clips having other geometric shapes, as discussed herein, can be substituted for one another and used interchangeably for one another. If longer clips are desired, clips 200 of FIG. 5 can be used instead of clips 100.

First, open the first clip 100*a* by sliding the post 120 away from the body 110 to separate them. Place the looped clip body 110 under the attaching material with the arches/loops facing to your right. The magnet side of the clip 130 should be touching the inside surface of the fabric or attaching material 300. Then, the post 120 is placed on the outside of the attaching material 300, with the magnet facing in towards the attaching material 300. In this way the body 110 and post 120 bond with the attaching material 300 in-between.

The foregoing steps are repeated, in a parallel manner, for the second clip 100*b*. In other words, the second body 110 is separated from its post 120 and then placed under the fabric with the loops to the right, at a distance 270 of about 5 inches from the first clip 100*a*. The second post 120 is placed over the second body 110 on the outside of the attaching material 300, as illustrated in FIG. 10A.

Once all four pieces (two posts 120 and two bodies 110) are in place, the two top magnets are moved together. Because the two clips 100*a*, 100*b* are oriented in the same direction, the poles of their magnets will also share the same orientation. This will cause the opposite poles of the top two magnets to repel one another, when brought into close proximity to one another, causing one of the clips 100*a*, 100*b* (in the illustrated case, clip 100*b*) to roll and abut one another at their flat sides, thus creating a decorative seam, as illustrated in FIG. 10B. The clips 100*a*, 100*b* should be held firmly, but such that one of the clips 100*a*, 100*b* is allowed to roll naturally. Additionally, the two clips 100*a*, 100*b* can be disconnected from one another without un-rolling them and place more fabric in-between the bond to create and play with the decorative style. As illustrated in FIG. 10B, only one full post 120 of clip 100*a* will be visible over the attaching material 300, as both bodies 110 are under the fabric, and the second post 120 of clip 100*b* is mostly covered by fabric during the roll 301.

Note that, if desired, the clip bodies and posts can be reversed, resulting in one of the clip bodies 110 being fully visible after the flip, and both posts 120 under the attaching material 300.

Figure 11B:
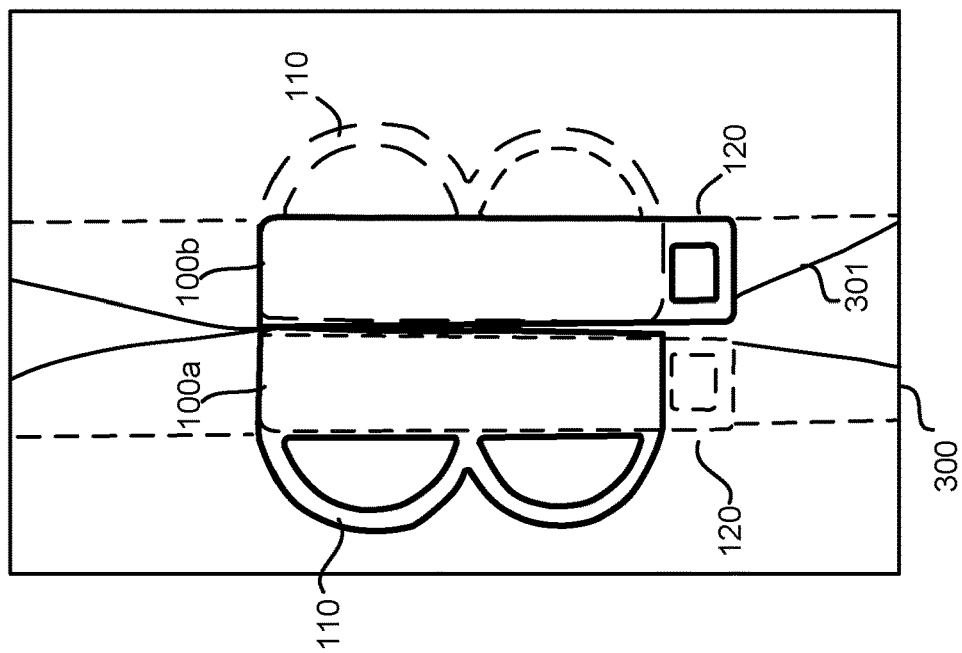
FIGS. 11A and 11B illustrates the use of a pair of clips, in accordance with another particular embodiment of the invention.
Figure 11A:
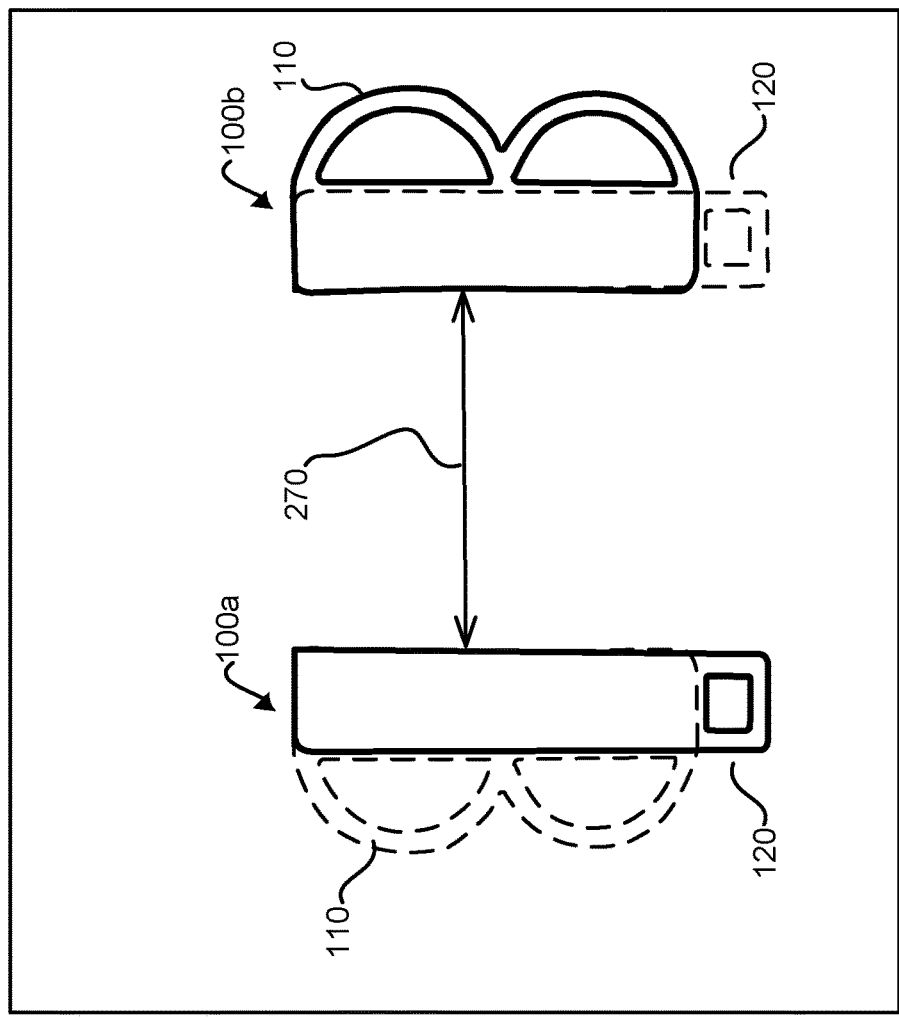

Alternately, referring now to FIGS. 11A and 11B, if desired, a decorative pleat can be created in which one clip body 110 and one post 120 are visible on the outside of the attaching material 300. In this embodiment, the clips 100*a* and 100*b* are oriented opposite to one another to begin with. First, the clip bodies 110 face in different directions. Further, whereas the clip body 110 of clip 100*a* is under the attaching material 300, the clip body 110 of clip 100*b* is above the attaching material 300, as illustrated in FIG. 11A. Correspondingly, the post 120 of clip 100*a* is above the attaching material, as illustrated in FIG. 11A, while the post 120 of clip 100*b* is initially under the attaching material 30. Note that this is not meant to be limiting, as the orientations of clips 100*a* and 100*b* can be exchanged without departing from the scope and spirit of the present invention. The two clips 100*a*, 100*b* are then brought into close proximity to one another, creating a seam, and are held together, side-by-side, by magnetic attraction, with the excess, pleated fabric beneath them, as illustrated in FIG. 11B.

Additionally, an accessory, in accordance with one embodiment of the present invention, can be used to personally adapt the fit of a garment to a wearer, such as a person or a mannequin. Among other things, an accessory, as described herein, can be used for scarfs, skirts, shirts, bandanas, belts or any arts and crafts projects that require stabilization to another pliable component. More particularly, magnetic clips according to the present invention allow the user the ability to custom fit and change the appearance of any shirt, skirt, scarf, belt or wearable garment without compromising the original design of the garment. This method also allows the user to custom tailor a garment to a correct size without having to take in a seam.

In a further embodiment of the invention, a system comprising one or more magnetic clips, such as magnetic clips 100, 100' or 200, and an elongate tying material 160 can be used to alter the fit or appearance of a garment. For example, referring now to FIGS. 12 and 13, a system is provided including a pair of magnetic clips 100 or 100', and an elongate tying material 160 extending between the loops (115 of FIG. 6; 115' of FIG. 7) of the pair of magnetic clips (100 of FIG. 12; 100' of FIG. 13) for closing or scrunching (i.e., cinching) the fabric 140 or garment 240 between the magnetic clips 100, 100', respectively. For example, referring now to FIG. 13, two (or more, if desired) magnetic clips 100' can be clamped onto the fabric of garment 240 by attaching the looped clip body 110' to the outside of the fabric, and the post part 120 to the inside face of the fabric (i.e., the inside of the garment or the inside face of a pleat or fold of the fabric), and lacing an elongated tying material 160 (i.e., a ribbon, cord, thong, etc.) through the loops 115', alternating from side to side, as is done when lacing shoelaces. This can give the garment the appearance of a corset. As can be understood, the user can modify spacing between the two clips 100' and the tension of the tying material by pulling the tying material 160 taut, to a desired tension. This design allows the user the ability to custom fit and change the appearance of any shirt, skirt, scarf, belt or wearable garment without compromising the original design of the garment. This method also allows the user to custom tailor a garment to a correct size without having to take in a seam. Additionally, it should be understood how the cinching feature can be adapted to attaching materials other than garments (i.e., tents, bed sheets, etc.).

Referring back to FIG. 12, as discussed above, instead of placing one magnetic clip part on the inside of a garment and the other on the outside, the fabric can be folded or pulled to create a pleat or fold 144, and one clip part 110 or 120 being placed on the outside of the pleat or fold 144, with the other clip part 110 or 120 being placed within the pleat or fold 144, such that both parts 110, 120 are on the outside of the attaching material 140, but one faces out from the attaching material 140, while the other is concealed in the pleat or fold 144. The loops 115 on a pair of these clips 100 can be interlaced, as illustrated in FIG. 12, with an elongated tying material 160, in order to pull the pleats 144 towards one another.

Figure 12:
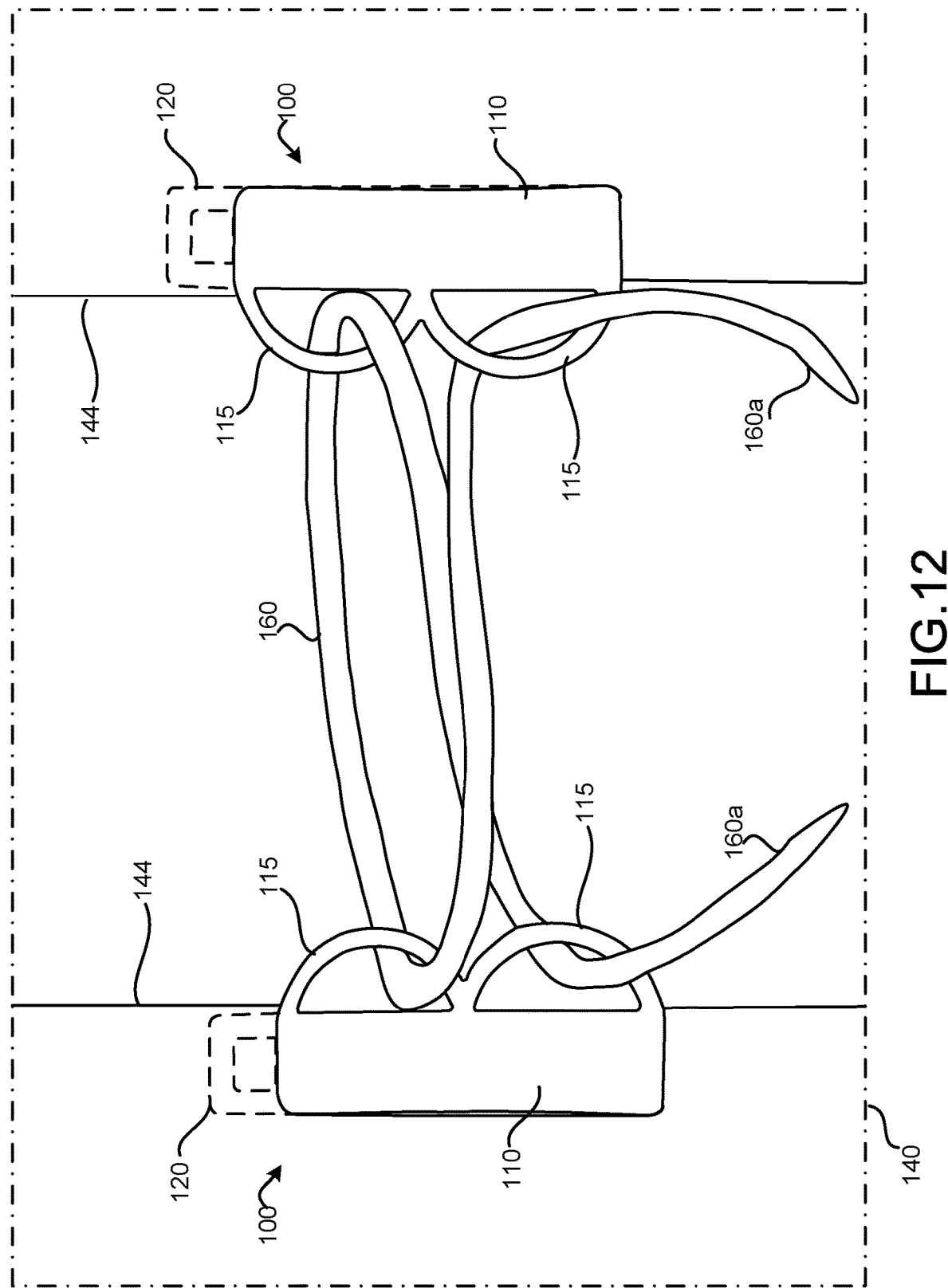
FIG. 12 illustrates a fashion accessory including at least two cinch clips attached to a garment, in accordance with one particular embodiment of the invention.
Figure 13:
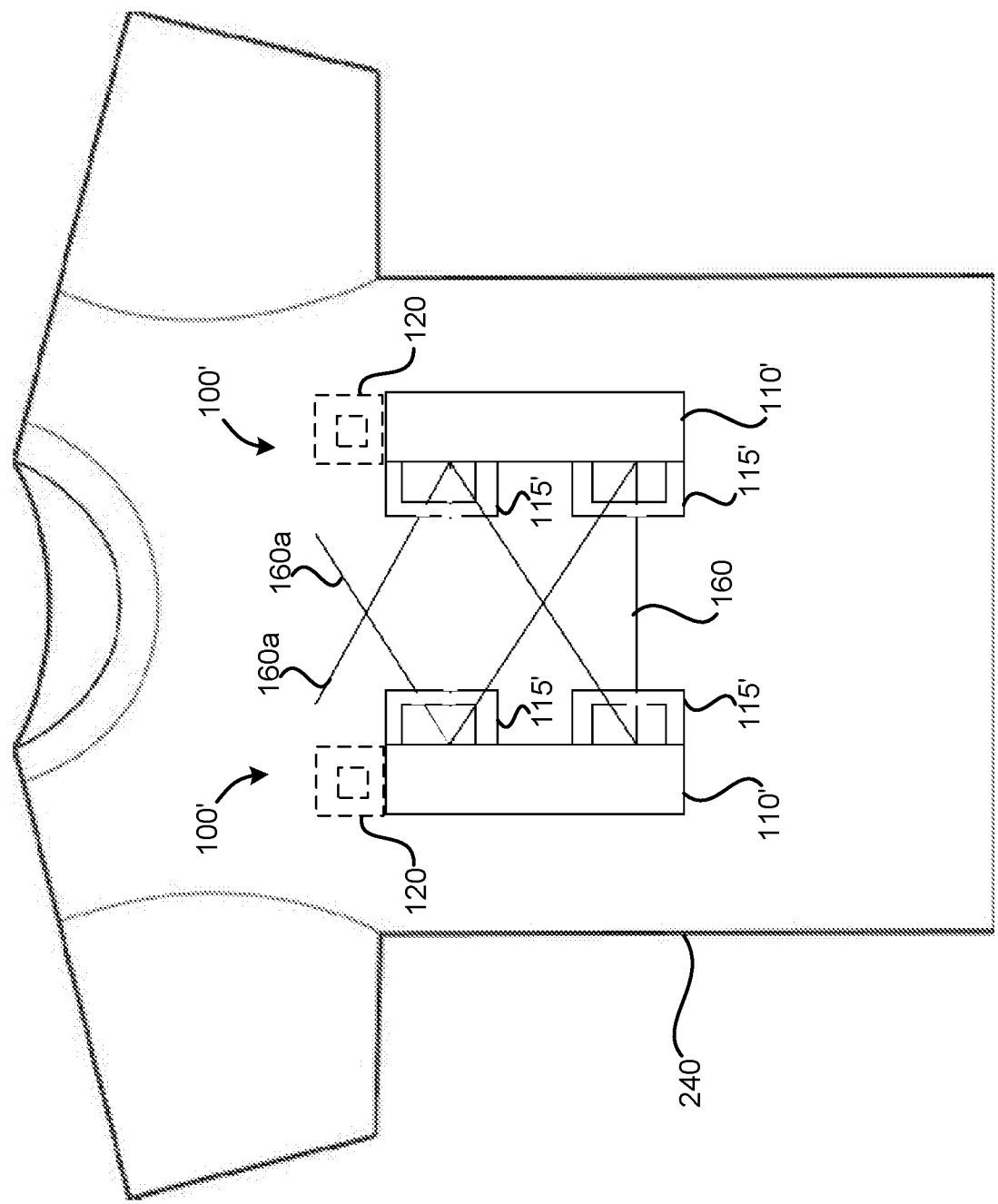
FIG. 13 illustrates a magnetic clip accessory including at least two, two-part magnetic clips attached to a garment, in accordance with a further particular embodiment of the invention.

After the elongated tying member 160, illustrated in FIGS. 12 and 13, is pulled to a desired level of tautness, and the clips are a desired distance apart, the free ends 160*a* of the elongated tying material 160 can be tied in a bow or knot, in order to maintain the clips 100, 100' at a desired set distance from one another, and the garment or attaching material is cinched, as desired.

One particular method of using a system in accordance with one particular embodiment of the invention will now be described in connection with FIG. 13. Note that, although the method will be described using magnetic clips 100', this is not meant to be limiting, as other geometrically shaped magnetic clips, including the magnetic clips 100, 200 can be used in place of one or both magnetic clips 100'. First, the parts 110', 120 of the magnetic clip 100' are separated from one another by sliding the magnets apart from one another, typically, along a longitudinal axis of the clip 100'. A post 120 is then placed on the inside of the garment 240, or inside a dress, scarf, or other attaching material, with the magnet 130 facing the front of the attaching material. Then, the clip body 110' is placed on the outside of the attaching material, with its magnet 130 facing into the garment, in order to mate the two magnets 130, and thus the two magnetic clip pieces 110', 120. More particularly, the two aligned magnets 130 will create a magnetic hold with fabric of the garment 240 or attaching material in-between. For best form fitting style, it is desirable to place the magnets 130 far enough apart to offer a laced up appearance—i.e., the farther apart they are, the better they appear. The clips 100', placed as described, can then be interlaced together with a ribbon, string or other elongate tying material 160, and tied off, as described above.

Figure 14:
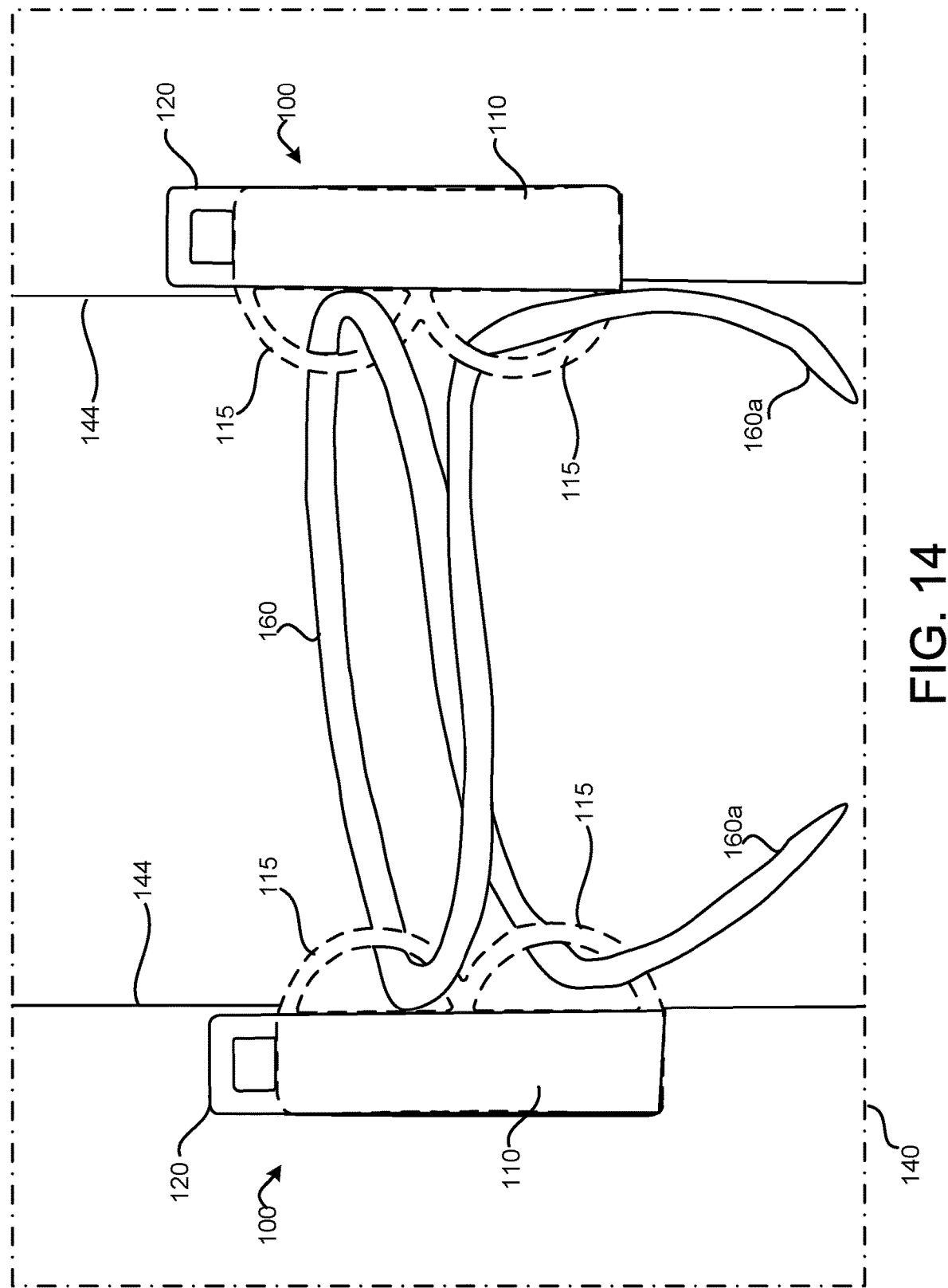
FIG. 14 illustrates a magnetic clip accessory including at least two, two-part magnetic clips arranged to tighten or cinch a garment, in accordance with a further particular embodiment of the invention.

In use, the magnetic clips 100, 100' may be reversible, with looped body 110/110' facing outward, or the post 120 facing outward. Additionally, the pieces of the magnetic clip 100, 100' can be hidden with the drape of a garment, if desired. For example, referring now to FIG. 14, a system in accordance with one preferred embodiment of the invention is provided in which a clip body 110 of the magnetic clip 100 is hidden in a pleat 144 of the fabric, but which still permits the cinching of the attaching material 140 using the pair of magnetic clips 100. In particular, in one embodiment, a one to two inch pleat 144 is formed in the fabric and held with a wearer's fingers.

The post 120 is placed on the outside of the pleat 144. The clip body 110 is then placed on the inside of the pleat so that the fabric is folded and there is one part 110, 120 on each side of the fold, and with the loops 115 pointing out from the fold. The clip body 110 will hide in the fold 144. Repeat the foregoing with a second clip 100 on another part of the garment, such that the loops 115 of the two clips 100 face one another. A string, ribbon or other elongate tying material 160 can be provided to lace between the loops 115 of the two clips 100. Note that, you may have to turn or flip one of the clip bodies 110, so that the loops 115 are facing each other from either end, in order to ensure that they are accessible to be laced up. The user will then pull the string or ribbon 160 to the desired tautness and tie it off.

As can be seen from the foregoing, the magnetic clips 100, 100', 200 of the present invention can clip on to a desired attaching material to allow the user the ability to securely hold the attaching material in place while obtaining a desired look, and without damaging the attaching material. Additionally, a magnetic clip accessory, in accordance with the present invention, can be used as a fashion accessory, to personally adapt the fit of a garment to a wearer, such as a person or a mannequin. Among other things, a fashion accessory, as described herein, can be used for scarfs, skirts, shirts, bandanas, belts or any arts and crafts projects that require stabilization to another pliable component. Further, as discussed herein, the clips can be used on non-garment related items, such as, but not limited to, tents, awnings, curtains, plastic, screens, aluminum gutters, other metal articles and glass, to allow decorative or other types of articles to hang from the clips.

The magnetic clip of the present invention, and/or a system including one or more multi-functional magnetic clips as described in accordance with the present invention are used as a temporary, removable accessory clip that firmly attaches to fabric or another attaching material without damaging or permanently altering the article to which it is attached. Additionally, although described herein in connection with specific examples, it should be understood that the invention is not limited only to those examples. It should be understood that magnetic clips according to the present invention can be used for other purposes (i.e., arts and crafts, household uses, etc.) without departing from the scope and spirit of the present invention. For example, the magnet is used for fastening to a desired project allowing the ability to attach and detach, at will, to any desired fabric or fixture, giving the user a flexibility of design options. Further, with the present invention, all components are advantageously reusable.

Accordingly, while a preferred embodiment of the present invention is shown and described herein, it will be understood that the invention may be embodied otherwise than as herein specifically illustrated or described, and that within the embodiments certain changes in the detail and construction, as well as the arrangement of the parts, may be made without departing from the principles of the present invention as defined by the appended claims.

The invention claimed is:

1. A two-part magnetic clip, comprising:
   a clip body including a first lengthwise edge defined between shorter second and third end faces, said clip body including at least two closed loops both extending off from, and formed integral with, said first lengthwise edge of the clip body;
   a post, separate from, and completely detachable from, said clip body, said post not being integrally formed with said clip body, said post including first and second elongated, lengthwise edges defined between shorter second and third end faces, said first and second lengthwise edges of said post not having loops extending therefrom; and
   a first elongate magnet fixed to a rear face of one of said clip body or said post, said first elongate magnet arranged to hold said clip body together with said post with an article captured between said clip body and said post.

2. A method for using a two-part magnetic clip, comprising the steps of:
   providing a two-part magnetic clip according to claim 1;
   placing the clip body and post on opposite sides of an article, or on opposite sides of a pleat formed in the article, such that the clip body and post are fixed to one another by magnetic attraction with the article held therebetween.

3. The method of claim 2, further comprising the step of lacing an elongated tying material through the at least two closed loops and tying together free ends of the elongated tying material to form a strap for supporting the article held between the clip body and post.

4. A method for cinching an article, comprising the steps of:
   providing first and second magnetic clips, each according to claim 1;
   for each of the first and second magnetic clips:
      placing the clip body and post on opposite sides of the article, or on opposite sides of a pleat formed in the article, such that the clip body and post are fixed to one another by magnetic attraction with the article held therebetween;
      lacing an elongated tying material through the at least two closed loops of the first and second magnetic clips to hold the first and second magnetic clips relative to one another in a spaced relationship;
      tightening the lacing between the first and second magnetic clips to a desired tautness; and
      subsequently, tying off free ends of the elongated tying material to fix the positions of the first and second magnetic clips relative to one another.

5. A system, comprising:
   a magnetic clip according to claim 1; and
   an elongated tying material laced through at least one of said at least two closed loops and tied off at free ends of said elongated tying material.

6. The system of claim 5, further comprising a second, two-part magnetic clip.

7. A method for cinching an article, comprising the steps of:
   providing a system according to claim 5;
   orienting the clip body sideways, with the at least two closed loops facing upward relative to the ground and placing the clip body and post on opposite sides of the article, or on opposite sides of a pleat formed in the article, such that the clip body and post are fixed to one another by magnetic attraction with the article held therebetween;
   lacing an elongated tying material through the at least one closed loop and tying free ends of the elongated tying material to form a strap for supporting the article held between the clip body and post.

8. A method for creating a seam or pleat in an attaching material, comprising the steps of:
   providing two magnetic clips according to claim 1;
   placing the first clip body of the first magnetic clip under the attaching material and mating the first post to said first clip body over the attaching material, the first post and first clip body held together with the attaching material between them by magnetic attraction;
   placing the second clip body of the second magnetic clip one of over an attaching material or under the attaching material at a distance from the first clip body and mating the second post to said second clip body the other one over the attaching material or under the attaching material, the second post and second clip body held together with the attaching material between them by magnetic attraction;
   bringing the first magnetic clip into close proximity to said second magnetic clip to mate the first magnetic clip to the second magnetic clip.

9. The method of claim 8, wherein the first magnetic clip and second magnetic clip have an identical orientation relative to the attaching material.

10. The method of claim 9, wherein the bringing step includes flipping the orientation of one of the magnetic clips relative to the other magnetic clip, to mate the first magnetic clip to the second magnetic clip by magnetic attraction.

11. A method of using a magnetic clip, comprising the steps of:
   providing a magnetic clip according to claim 1;

affixing the magnetic clip to an attaching material; and hanging an object from at least one closed loop of the magnetic clip.

12. The method of claim 11, wherein the object is a decorative object.

13. The method of claim 11, wherein the object is a sign.

14. A method of using a magnetic clip, comprising the steps of:

providing a plurality of magnetic clips according to claim 1; and affixing each of the plurality of magnetic clips to an attaching material in a spaced relationship to one another.

15. The method of claim 14, further comprising the step of weaving an elongate strand material through at least one loop of each of the plurality of magnetic clips.

16. The method of claim 15, wherein the elongate strand material includes a string of lights.

17. The method of claim 15, wherein the strand is used to support a sign or decorative element.

18. The method of claim 14, wherein a plurality of magnetic clips are used to support a decorative article.

19. The method of claim 18, wherein the decorative article is at least one of a sign, a wind chime or a mobile.

20. A method for creating a seam or pleat in an attaching material, comprising the steps of:

providing two magnetic clips according to claim 1;

placing the first clip body of the first magnetic clip on the attaching material and mating the first post to said first clip body with the attaching material captured between the first post and the first clip body, the first post and first clip body held together with the attaching material between them by magnetic attraction;

placing the second clip body of the second magnetic clip on the attaching material at a distance from said first magnetic clip, and mating the first post to said first clip body with the attaching material captured between the first post and the first clip body, the second post and second clip body held together with the attaching material between them by magnetic attraction;

bringing the first magnetic clip into close proximity to said second magnetic clip to mate the first magnetic clip to the second magnetic clip, creating a seam or pleat in the attaching material.

* * * * *